(12) United States Patent
Fukushima

(10) Patent No.: US 10,216,461 B2
(45) Date of Patent: Feb. 26, 2019

(54) INFORMATION PROCESSING APPARATUS, CONTROL METHOD OF THE SAME, AND PROGRAM

(71) Applicant: CANON KABUSHIKI KAISHA, Tokyo (JP)

(72) Inventor: Michio Fukushima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/743,881

(22) PCT Filed: Sep. 2, 2016

(86) PCT No.: PCT/JP2016/004025
§ 371 (c)(1),
(2) Date: Jan. 11, 2018

(87) PCT Pub. No.: WO2017/043064
PCT Pub. Date: Mar. 16, 2017

(65) Prior Publication Data
US 2018/0203651 A1 Jul. 19, 2018

(30) Foreign Application Priority Data

Sep. 11, 2015 (JP) .................................. 2015-180117

(51) Int. Cl.
*G06F 3/12* (2006.01)
*G03G 15/00* (2006.01)
(Continued)

(52) U.S. Cl.
CPC ............ *G06F 3/1221* (2013.01); *G01S 7/006* (2013.01); *G01S 15/04* (2013.01); *G01S 15/101* (2013.01);
(Continued)

(58) Field of Classification Search
CPC .... G06F 3/1221; G06F 1/3231; G06F 1/3287; G06F 3/1292; G01S 15/04; G01S 15/101;
(Continued)

(56) References Cited

U.S. PATENT DOCUMENTS 8,848,486 B1 * 9/2014 Elwell ................. G01S 7/52004
367/117
9,157,996 B1 * 10/2015 Elwell ..................... G01S 15/04
(Continued)

FOREIGN PATENT DOCUMENTS

| JP | S56101159 A | 8/1981 |
| JP | 2004363670 A | 12/2004 |
| JP | 2015512212 A | 4/2015 |

OTHER PUBLICATIONS

International Search Report issued in Intl. Appln. No. PCT/JP2016/004025 dated Dec. 6, 2016.
(Continued)

*Primary Examiner* — Hirdepal Singh
(74) *Attorney, Agent, or Firm* — Rossi, Kimms & McDowell LLP

(57) ABSTRACT

An image forming apparatus 10 is configured to detect a human present in a first range (detection area A1) from the image forming apparatus 10 using an ultrasonic wave that is output at a first frequency from an ultrasonic sensor 611. If a human is detected in the detection area A1, the image forming apparatus 10 switches the frequency of the ultrasonic wave that is output from the ultrasonic sensor 611 to a second frequency that is lower than the first frequency, and is controlled to detect the human in a second range (detection area A2) that is smaller than the detection area A1. When a human is detected in the detection area A2, data communication is started using the ultrasonic wave output from the ultrasonic sensor 611.

13 Claims, 16 Drawing Sheets

(51) Int. Cl.
  *G01S 15/88* (2006.01)
  *G01S 7/00* (2006.01)
  *G01S 15/10* (2006.01)
  *G01S 15/18* (2006.01)
  *G01S 15/04* (2006.01)
  *G06F 1/3231* (2019.01)
  *G06F 1/3287* (2019.01)

(52) U.S. Cl.
  CPC ............ *G01S 15/107* (2013.01); *G01S 15/18* (2013.01); *G01S 15/88* (2013.01); *G03G 15/5004* (2013.01); *G06F 1/3231* (2013.01); *G06F 1/3287* (2013.01); *G06F 3/1292* (2013.01)

(58) Field of Classification Search
  CPC ........ G01S 15/107; G01S 15/18; G01S 15/88; G01S 7/006; G03G 15/5004
  USPC .......................................................... 367/93
  See application file for complete search history.

(56) References Cited

U.S. PATENT DOCUMENTS

| | | | |
|---|---|---|---|
| 9,903,942 B2* | 2/2018 | Harada | G01S 15/931 |
| 2009/0009306 A1* | 1/2009 | Magane | G01S 15/931 340/435 |
| 2009/0279389 A1* | 11/2009 | Irie | G01S 7/003 367/118 |
| 2012/0163124 A1* | 6/2012 | Akiyama | B06B 1/0292 367/87 |
| 2012/0229831 A1* | 9/2012 | Kuroishi | H04N 1/00891 358/1.13 |
| 2013/0051818 A1* | 2/2013 | Mori | G01N 29/348 399/16 |
| 2013/0188851 A1* | 7/2013 | Miyasa | G06T 7/0012 382/131 |
| 2014/0024941 A1* | 1/2014 | Umeda | A61B 8/14 600/445 |
| 2014/0355020 A1* | 12/2014 | Shiraishi | H04N 1/00896 358/1.13 |
| 2015/0009016 A1 | 1/2015 | Dai | |
| 2017/0272946 A1* | 9/2017 | Watanabe | H04L 63/0853 |
| 2017/0329004 A1* | 11/2017 | Yoo | G01S 7/52003 |
| 2018/0003808 A1* | 1/2018 | Niwa | G01S 15/93 |

OTHER PUBLICATIONS

Written Opinion issued in Intl. Appln. No. PCT/JP2016/004025 dated Dec. 6, 2016.

* cited by examiner

[Fig. 1]
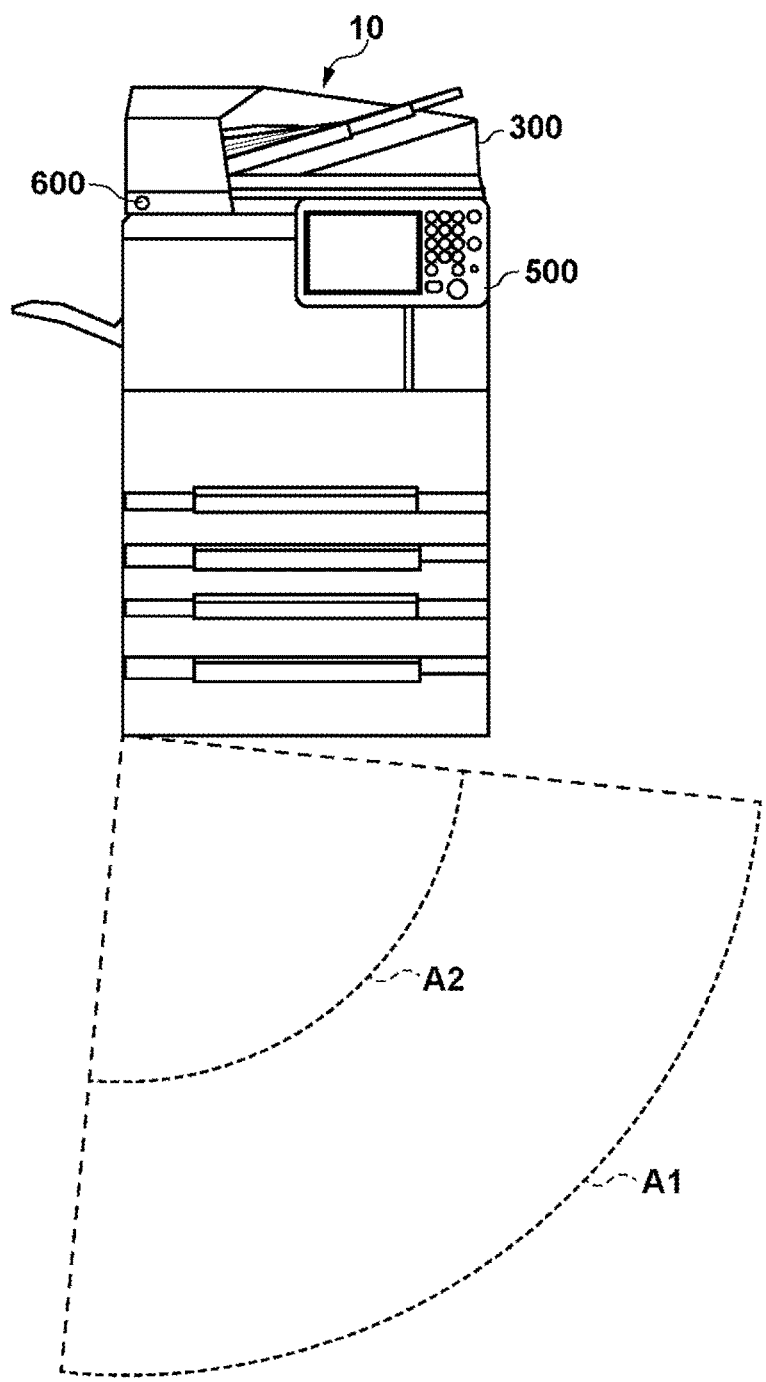

[Fig. 2]
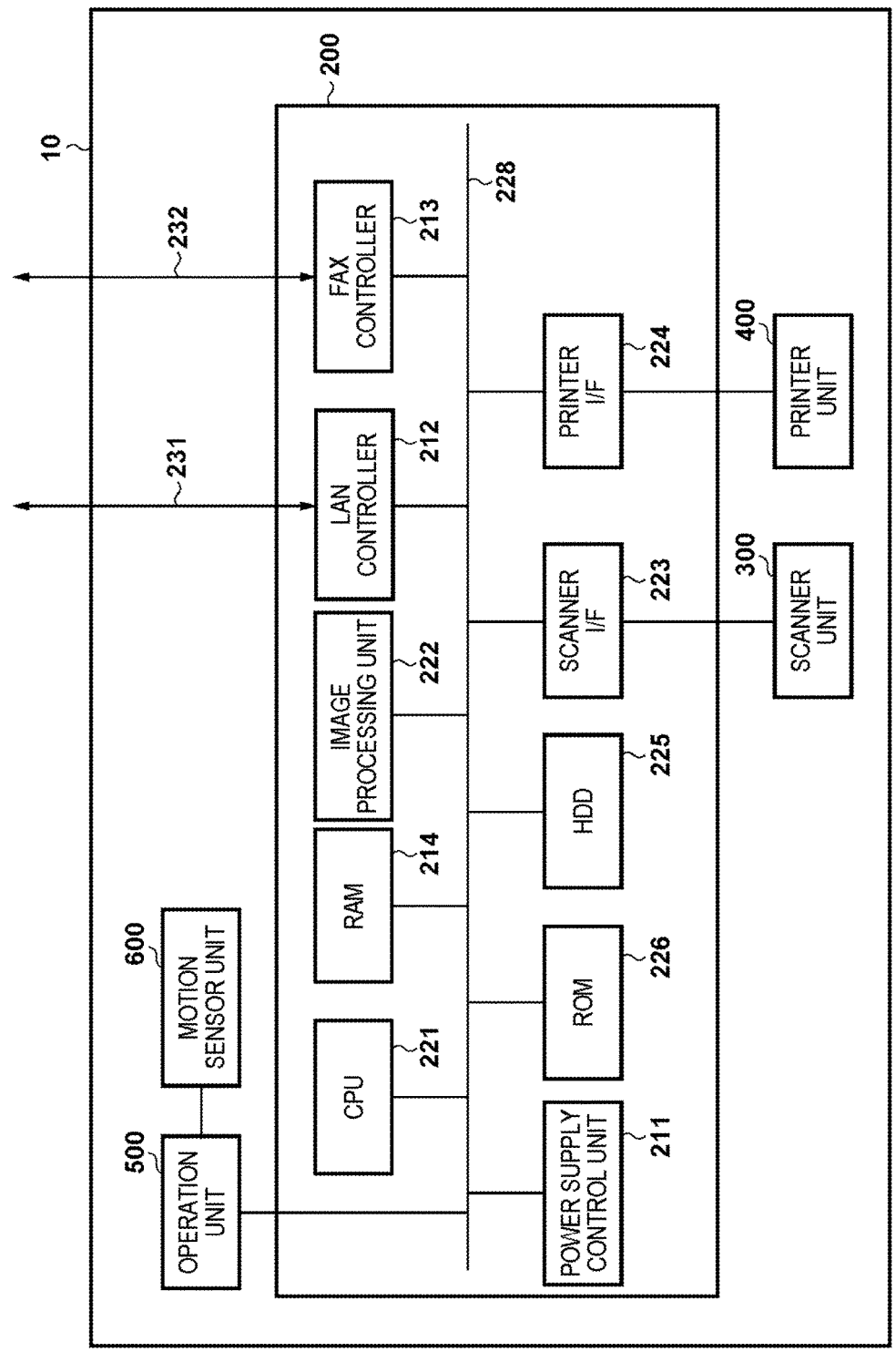

[Fig. 3]
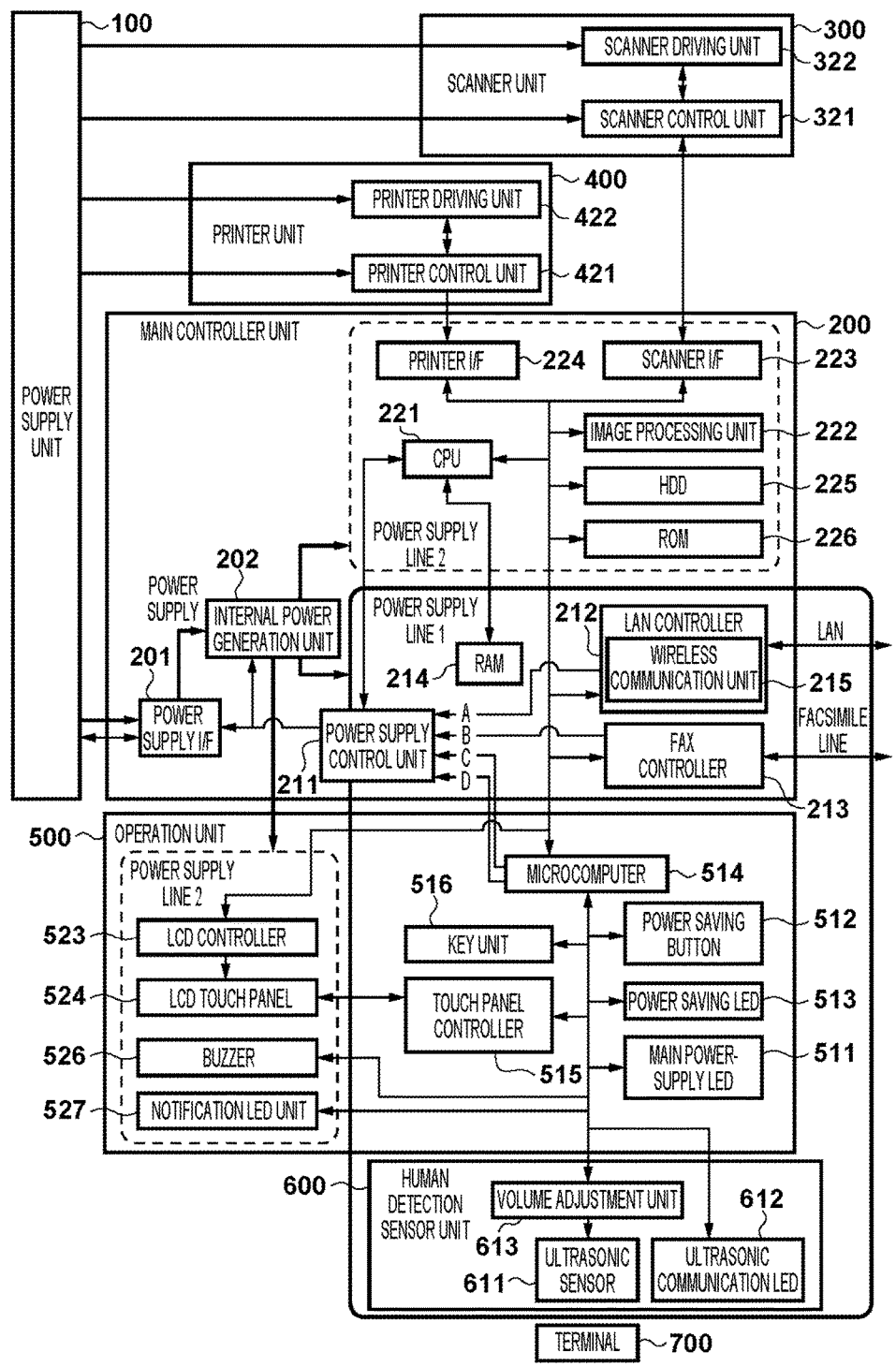

[Fig. 4]
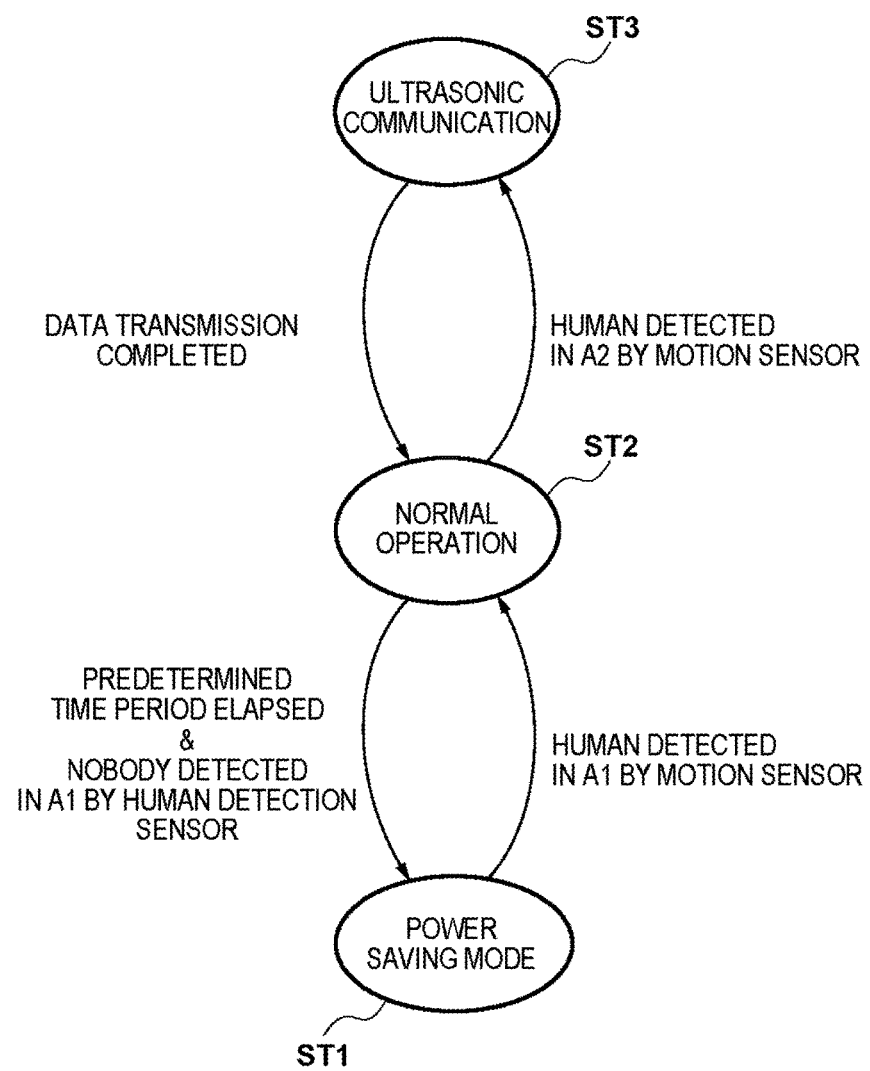

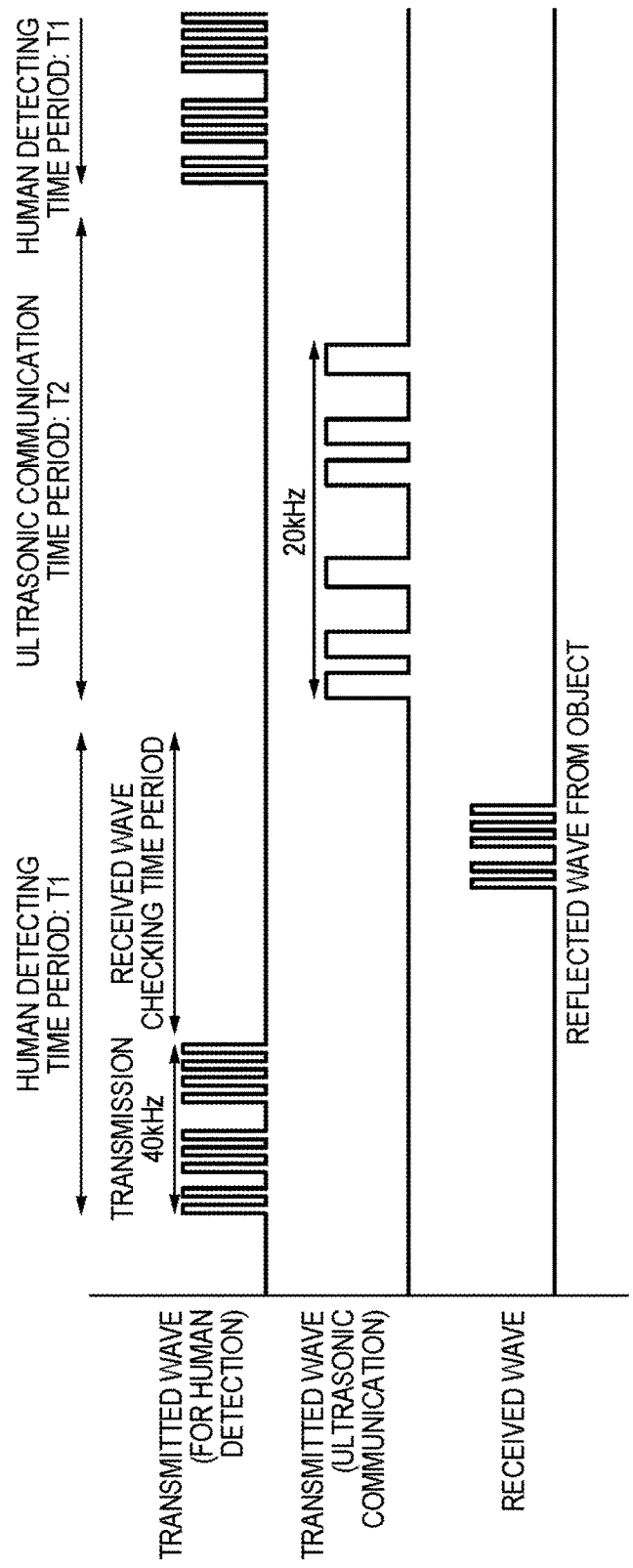
[Fig. 5]

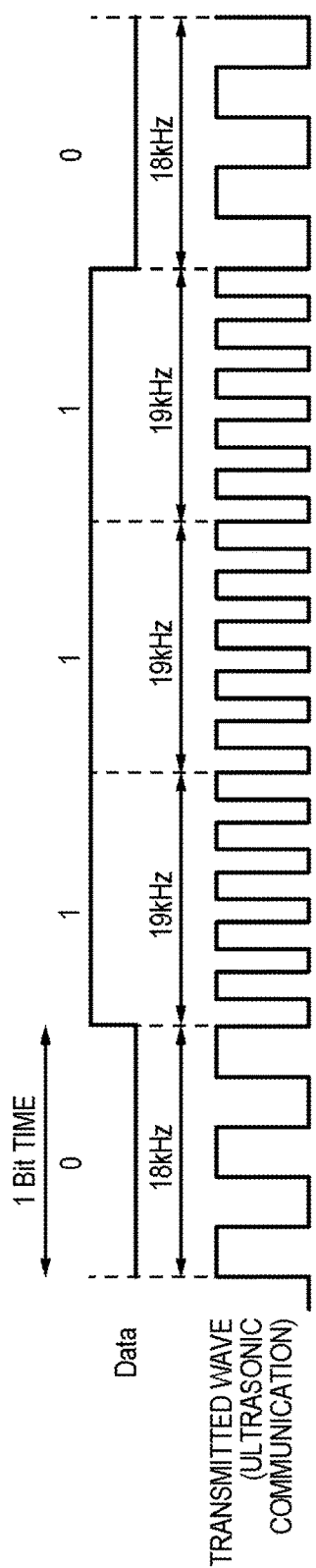

[Fig. 7]
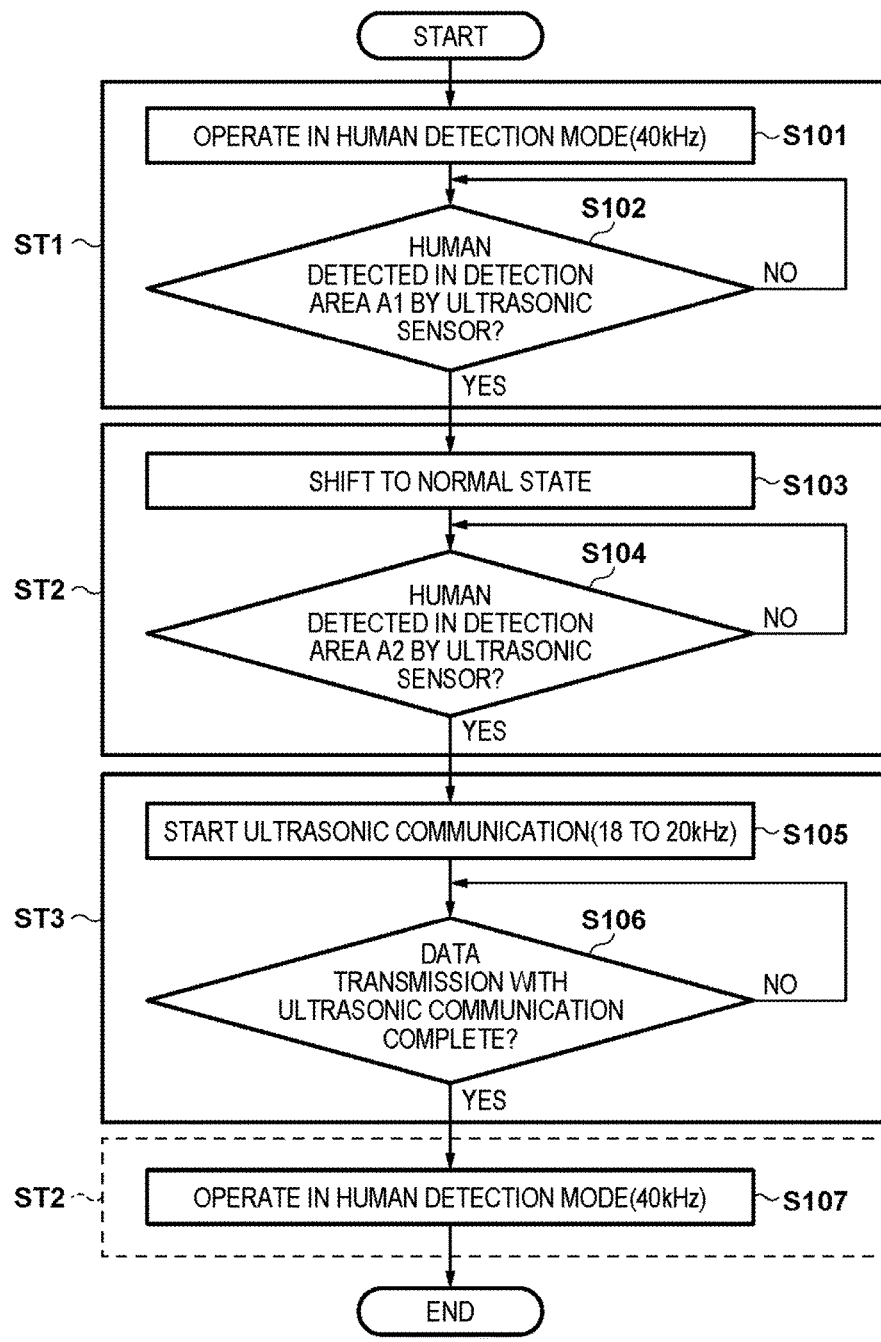

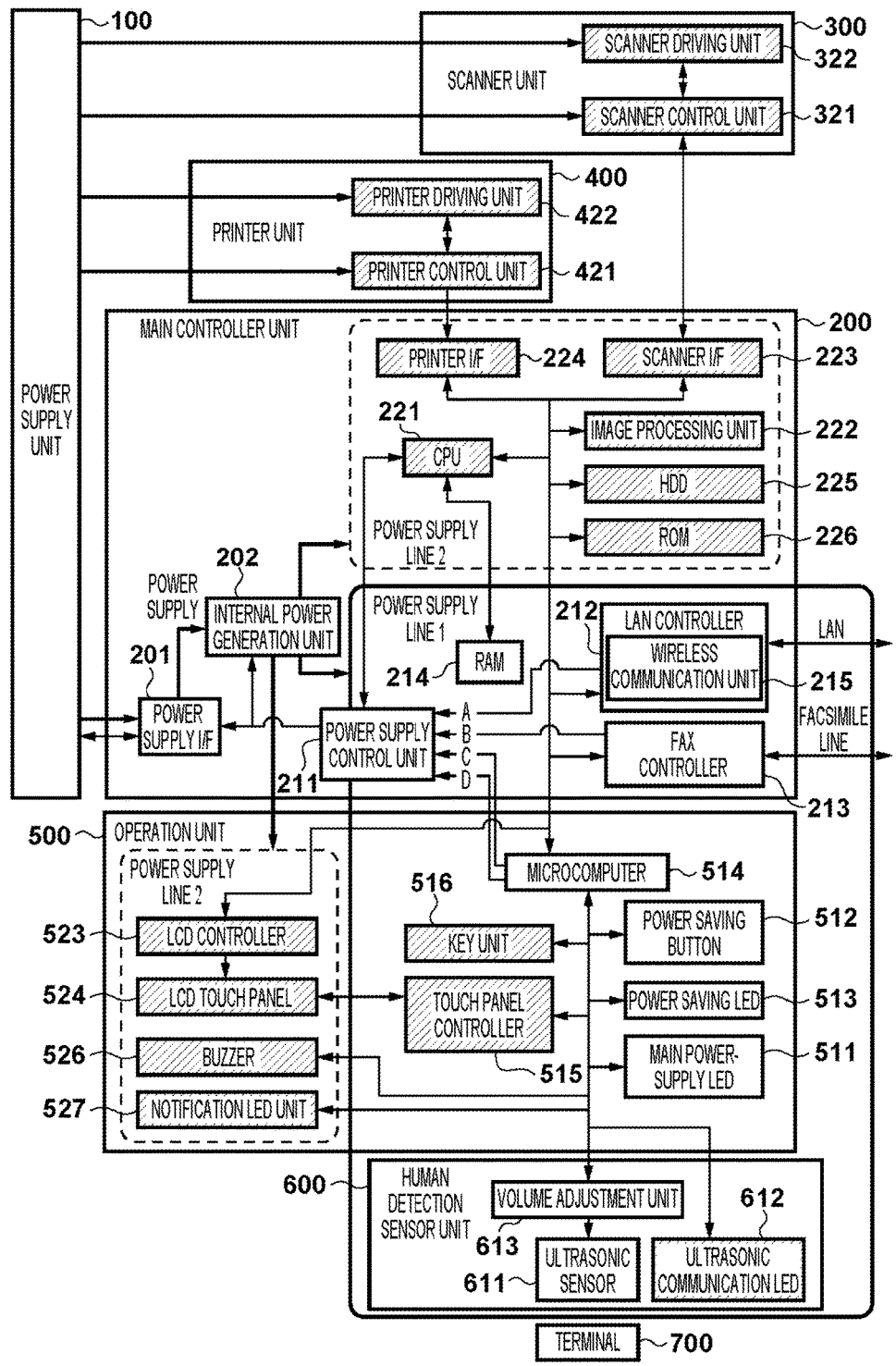
[Fig. 8]

[Fig. 9]
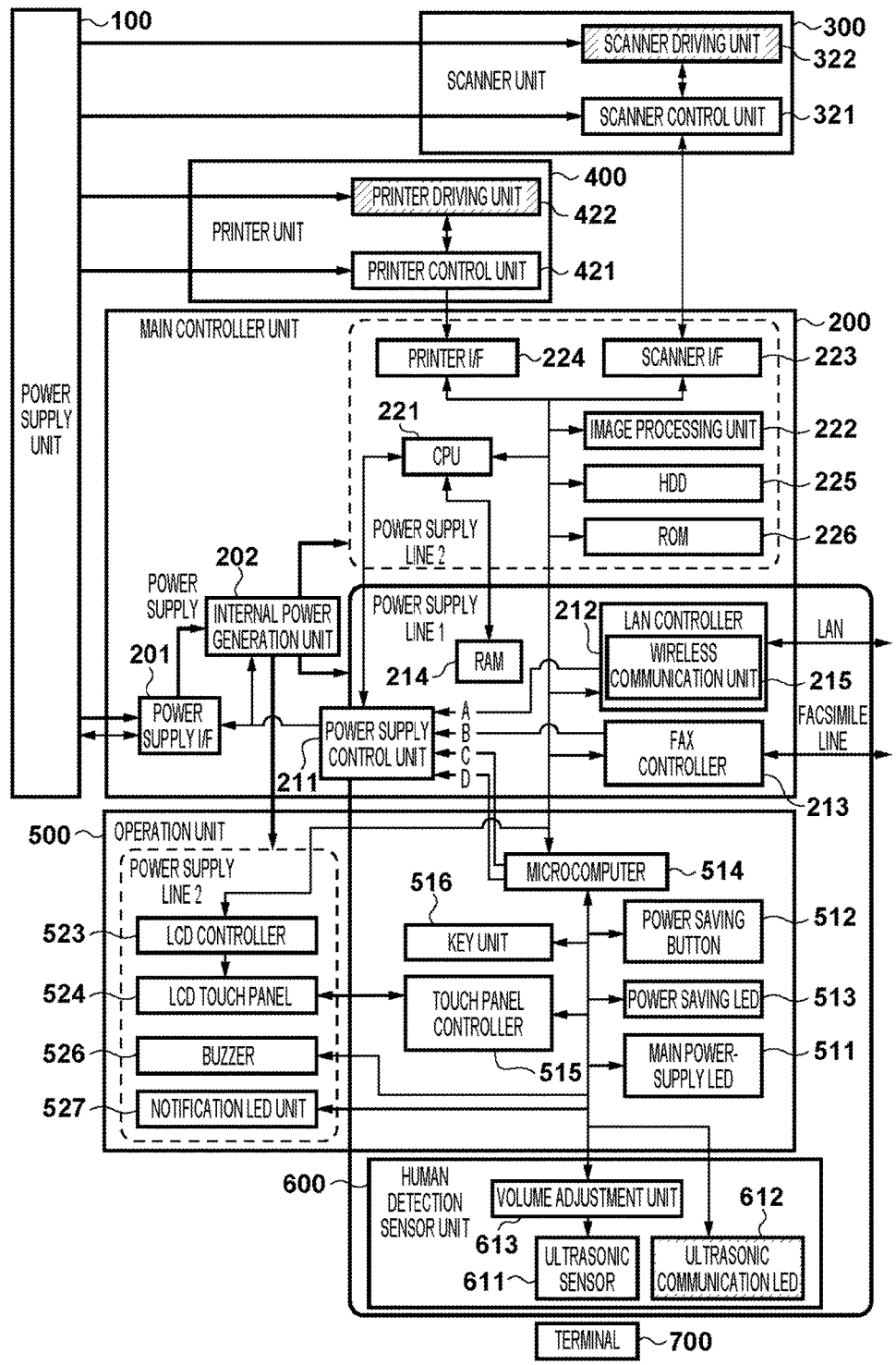

[Fig. 10]
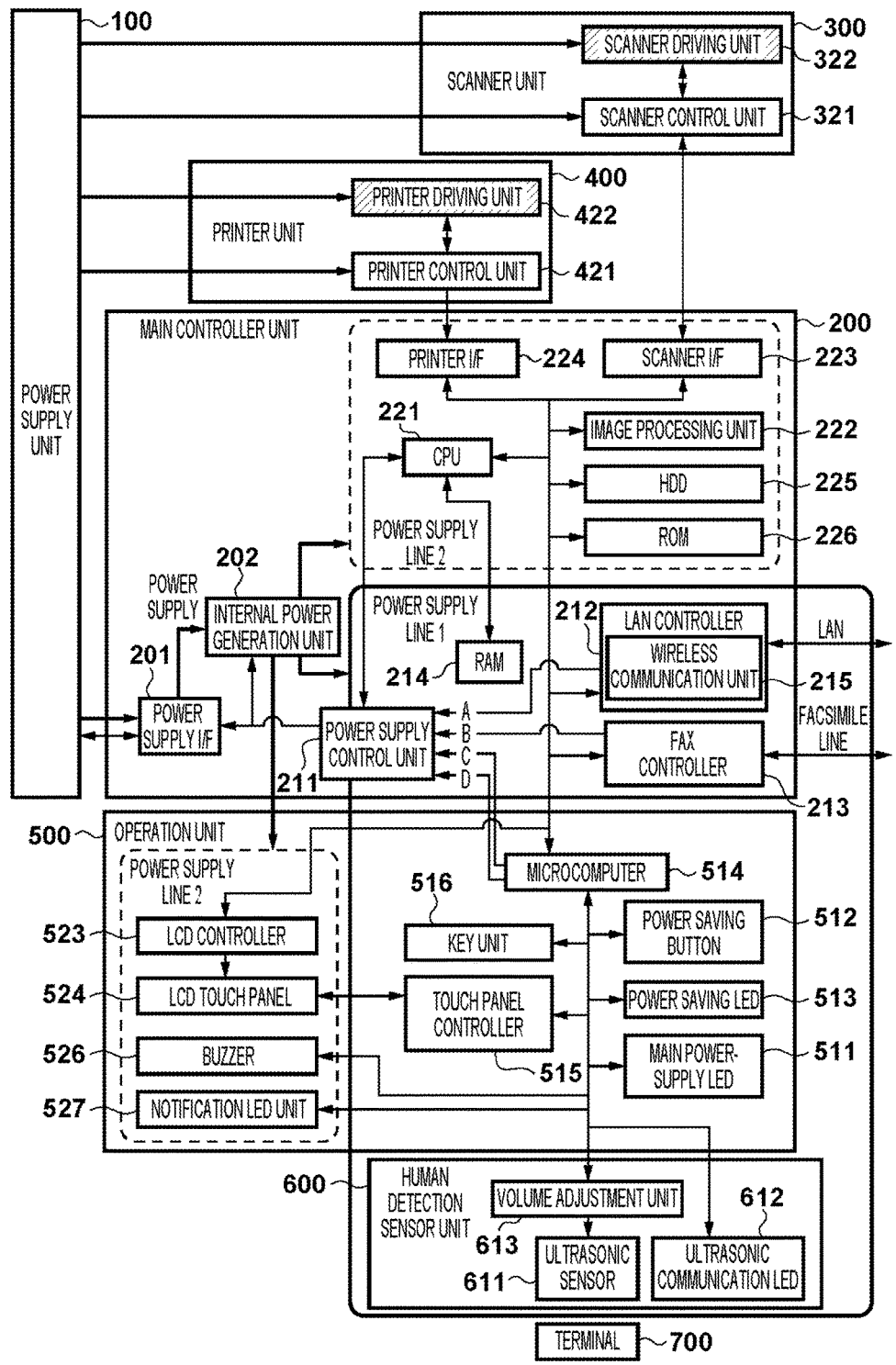

[Fig. 11]
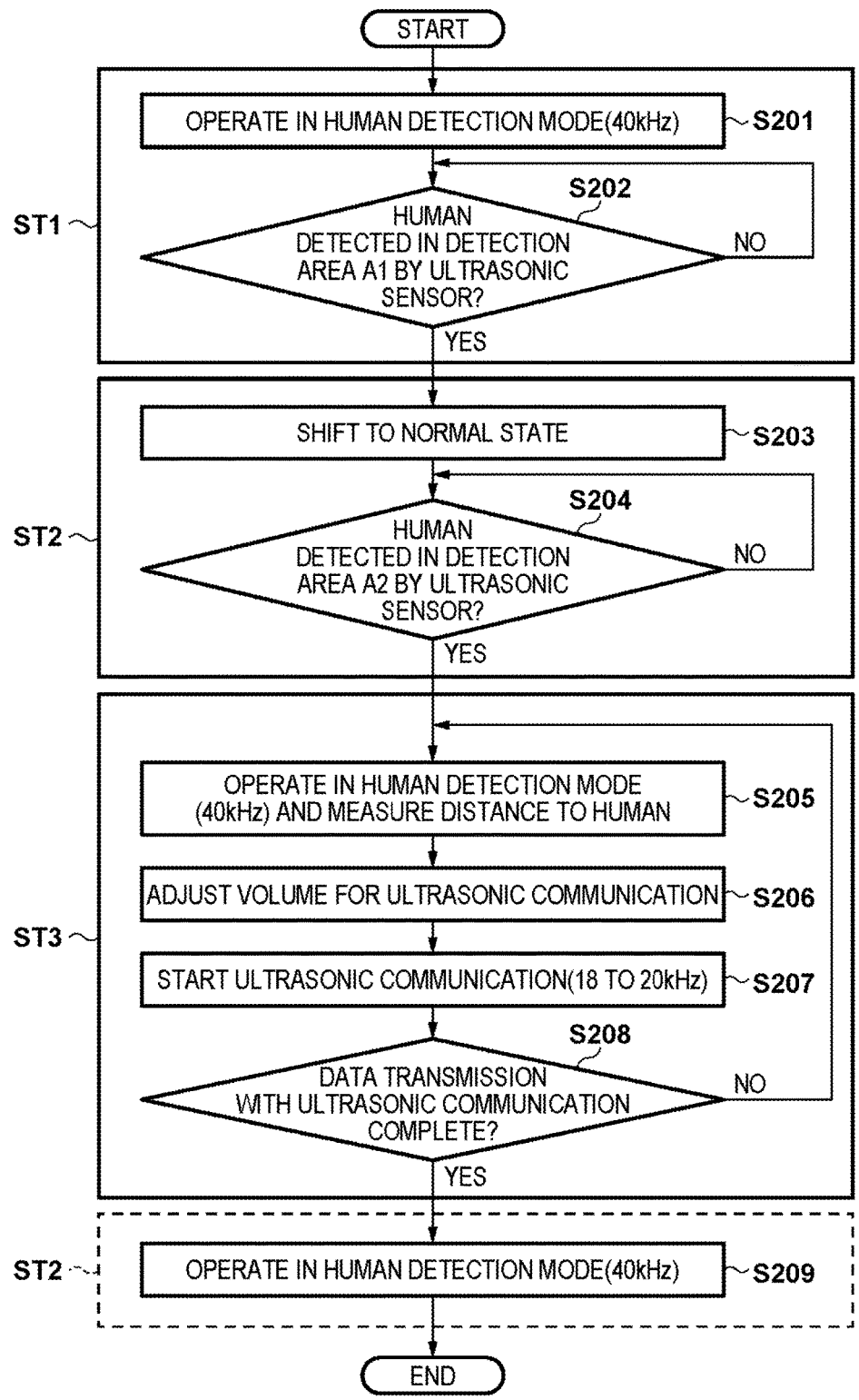

[Fig. 12]
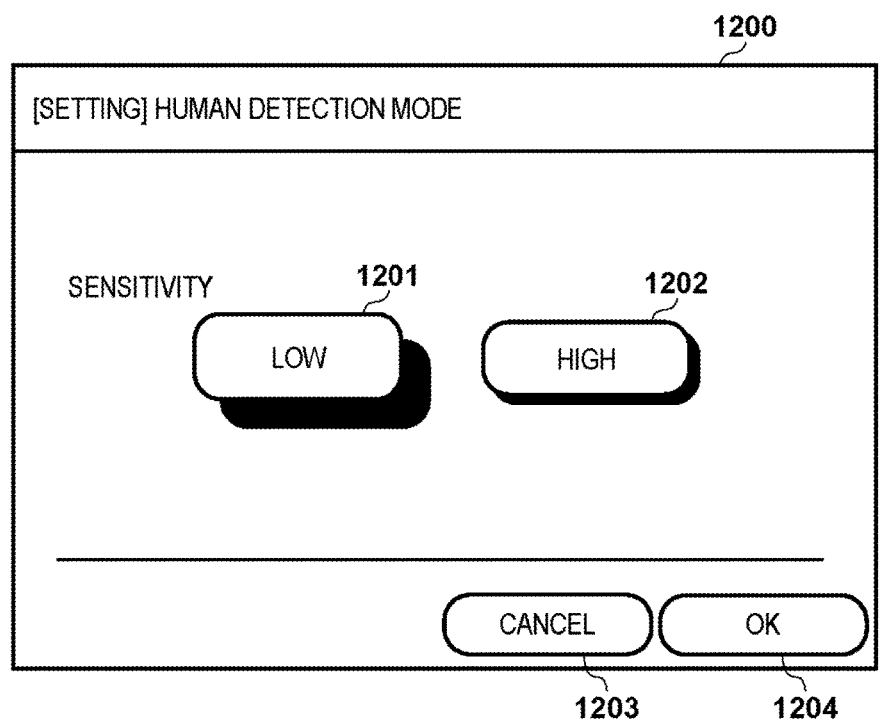

[Fig. 13]
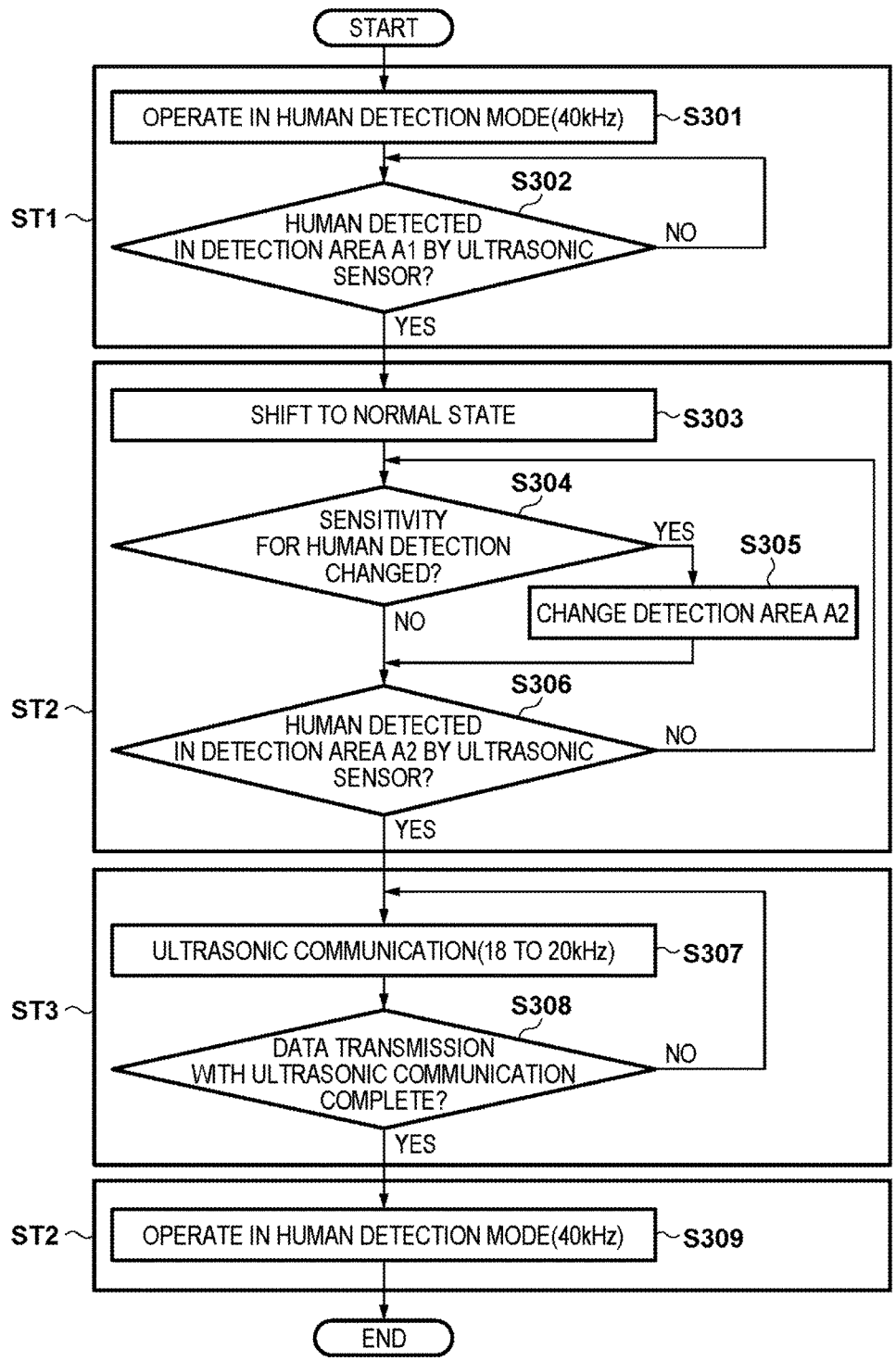

[Fig. 14]
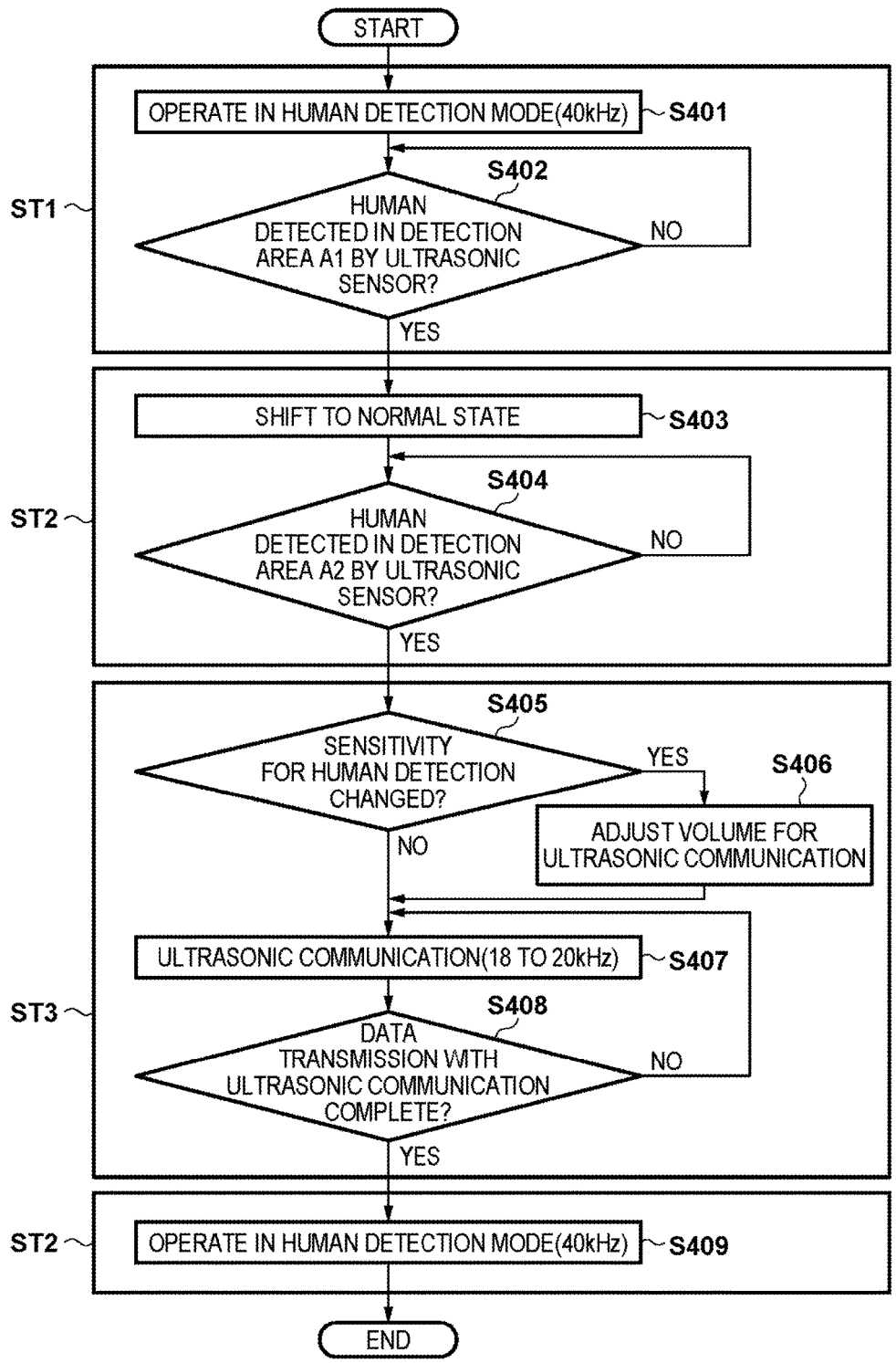

[Fig. 15]
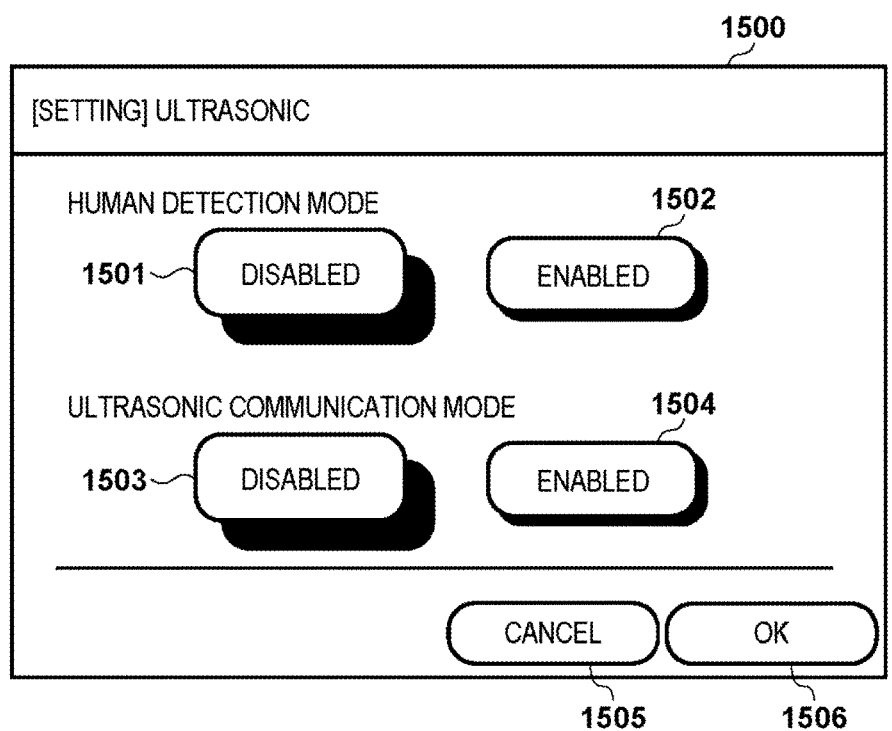

[Fig. 16]
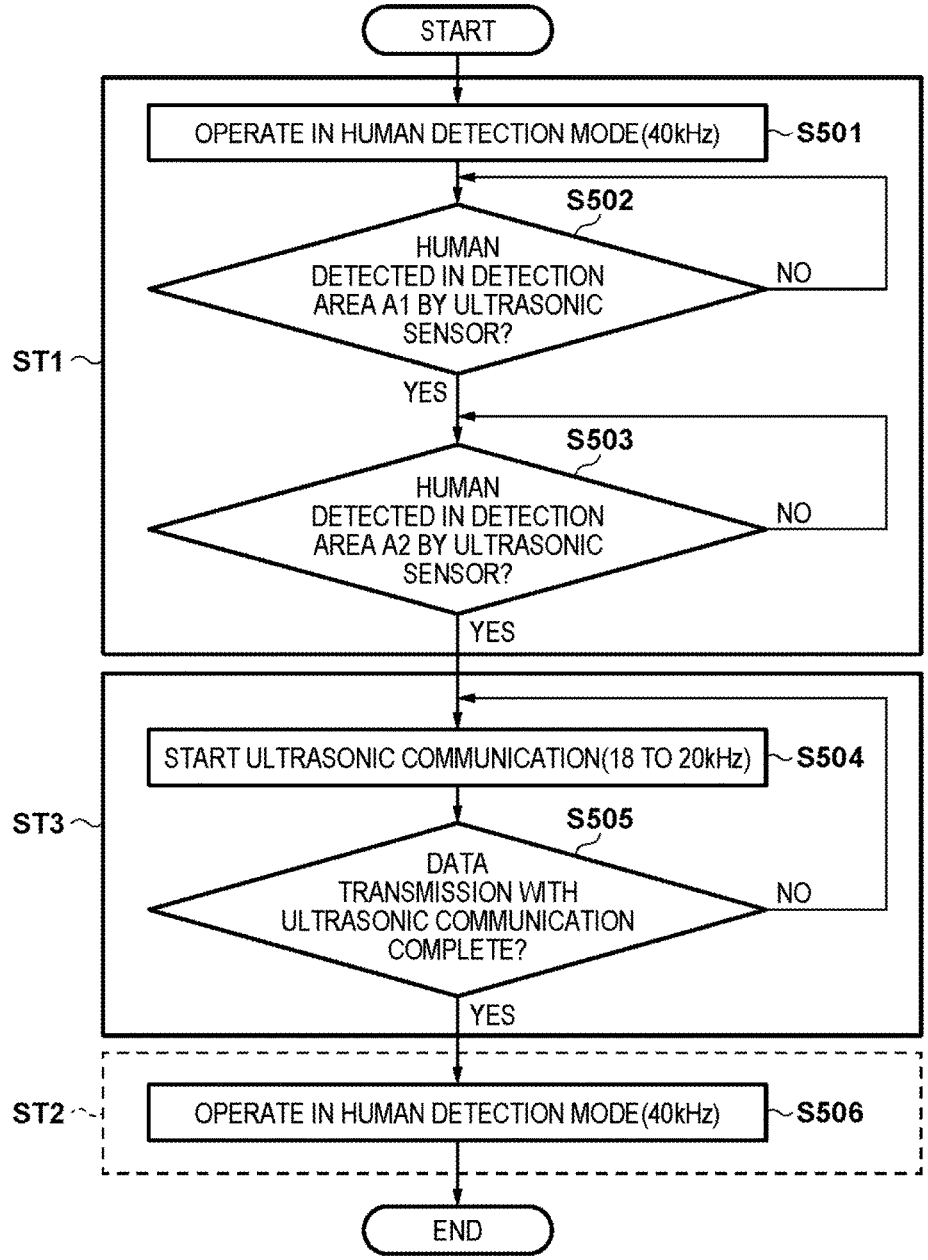

INFORMATION PROCESSING APPARATUS, CONTROL METHOD OF THE SAME, AND PROGRAM

TECHNICAL FIELD

The present invention relates to an information processing apparatus, a control method of the same, and a program.

BACKGROUND ART

Modern image forming apparatuses have a power saving mode function for reducing power consumption during a period in which it is not used by a user. Also, there are cases where image forming apparatuses include a human detection sensor that reacts if a user approaches the image forming apparatus in the power saving mode, and the apparatus returns from the power saving mode to a normal operation. A sensor such as a pyroelectric sensor or an ultrasonic sensor is used as the human detection sensor.

Japanese Patent Laid-Open No. 2015-512212 discloses a technique for achieving Wi-Fi connection by providing a modern terminal such as a smartphone with an NFC function through which authentication data is transmitted to the terminal from an apparatus without a user inputting settings. Furthermore, Japanese Patent Laid-Open No. 2004-363670 discloses a technique in which a terminal such as a smartphone is provided with a speaker or a microphone, communication is performed using a sound wave output from the speaker, and data such as authentication information is exchanged.

However, the above-described conventional techniques have the following problems. For example, the image forming apparatuses according to the conventional techniques use an ultrasonic sensor as the human detection sensor for shifting from the power saving mode to normal operation, and have the NFC function or the like in order to perform authentication with respect to a terminal such as a smartphone. However, providing such an image forming apparatus with both the ultrasonic sensor for human detection and the NFC function for authentication causes the problems of increased cost and additional places for installation being needed. Therefore, there is a demand to use one ultrasonic sensor, or to use one control unit to control an ultrasonic sensor, to be able to achieve both human detection and communication for transmitting authentication data. However, there is no clear rule as to when these functions are to be switched. Another problem is that a frequency for communication (18 kHz to 22 kHz) output from an ultrasonic sensor will create an audible sound that is unpleasant to those who can hear it, and thus it is preferable for the ultrasonic sensor not to output the frequency for communication.

SUMMARY OF INVENTION

The present invention enables realization of a mechanism in which an ultrasonic sensor unit is used for detecting a human and for transmitting data for communication by appropriately switching between the functions, and reducing output of a frequency for communication that will create an audible sound unpleasant to users.

One aspect of the present invention provides an information processing apparatus comprising: an ultrasonic sensor unit for outputting an ultrasonic wave to a vicinity of the information processing apparatus; human detection means for detecting a human located in the vicinity of the information processing apparatus using the ultrasonic wave output from the ultrasonic sensor unit; communication means for performing data communication between the information processing apparatus and an external terminal, using the ultrasonic wave output from the ultrasonic sensor unit; and control means for switching, if the human detection means has detected a human present in a first range from the information processing apparatus using the ultrasonic wave that was output at a first frequency from the ultrasonic sensor unit, the frequency of the ultrasonic wave that is output from the ultrasonic sensor unit to a second frequency that is lower than the first frequency, controlling the human detection means to detect the human in a second range that is smaller than the first range, and starting the data communication using the communication means if the human is detected in the second range by the human detection means.

Another aspect of the present invention provides a control method of an information processing apparatus that includes: an ultrasonic sensor unit for outputting an ultrasonic wave to a vicinity of the information processing apparatus; human detection means for detecting a human located in the vicinity of the information processing apparatus using the ultrasonic wave output from the ultrasonic sensor unit; communication means for performing data communication between the information processing apparatus and an external terminal using the ultrasonic wave output from the ultrasonic sensor unit; and control means, the control method comprising: the control means switching, if the human detection means has detected a human present in a first range from the information processing apparatus using the ultrasonic wave that was output at a first frequency from the ultrasonic sensor unit, the frequency of the ultrasonic wave that is output from the ultrasonic sensor unit to a second frequency that is lower than the first frequency; the control means controlling the human detection means to detect the human in a second range that is smaller than the first range; and the control means starting the data communication using the communication means if the human is detected in the second range by the human detection means.

Further features of the present invention will be apparent from the following description of exemplary embodiments with reference to the attached drawings.

BRIEF DESCRIPTION OF DRAWINGS

FIG. 1 is a diagram illustrating the outer appearance of an image forming apparatus 10 according to an embodiment.

FIG. 2 is a simple block diagram illustrating the image forming apparatus 10 according to an embodiment.

FIG. 3 is a detailed block diagram illustrating the image forming apparatus 10 according to an embodiment.

FIG. 4 is a diagram illustrating state transition of the image forming apparatus 10 according to an embodiment.

FIG. 5 illustrates a method in which an ultrasonic sensor performs switching between human detection and communication.

FIG. 6 illustrates a data transmission method (FSK) in ultrasonic communication.

FIG. 7 is a flowchart of a processing procedure of the image forming apparatus 10 according to an embodiment.

FIG. 8 is a diagram illustrating a current applied state of a power supply when the image forming apparatus 10 according to an embodiment is in a power saving mode (ST1).

FIG. 9 is a diagram illustrating the current applied state of the power supply when the image forming apparatus 10 according to an embodiment is in a normal operation power mode (ST2).

FIG. 10 is a diagram illustrating the current applied state of the power supply when the image forming apparatus 10 according to an embodiment is in an ultrasonic communication operation mode (ST3).

FIG. 11 is a flowchart of a processing procedure of the image forming apparatus 10 according to an embodiment.

FIG. 12 is a diagram illustrating a screen for changing sensitivity in a human detection mode according to an embodiment.

FIG. 13 is a flowchart of a processing procedure of the image forming apparatus 10 according to an embodiment.

FIG. 14 is a flowchart of a processing procedure of the image forming apparatus 10 according to an embodiment.

FIG. 15 is a diagram illustrating a screen for setting the human detection mode and an ultrasonic communication mode to be enabled or disabled according to an embodiment.

FIG. 16 is a flowchart of a processing procedure of the image forming apparatus 10 according to an embodiment.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Information Processing Apparatus

Hereinafter, a first embodiment of the present invention will be described with reference to FIGS. 1 to 10. First, a configuration of an image forming apparatus 10, which serves as an example of an information processing apparatus of the present embodiment, will be described with reference to FIG. 1. Although the present embodiment is described taking the image forming apparatus as an example of an apparatus that is applied to the present invention, the present invention is not limited to this, and any information processing apparatus is applicable as long as it outputs an ultrasonic wave or the like for human detection and for communication, for example.

The image forming apparatus 10 is a multifunction printer (MFP) that has multiple functions, such as a print function, a scan function, a copy function, and a facsimile function. The image forming apparatus 10 is provided with a human detection sensor unit 600 for detecting a human approaching the image forming apparatus 10. When the human detection sensor unit (ultrasonic sensor unit) 600 has detected a human who is approaching the front of the image forming apparatus 10, the image forming apparatus 10 returns from a power saving mode in which power consumption is low to a power state in which any of the above-described functions can be used.

The human detection sensor unit 600 is an ultrasonic sensor, and can output two types of frequencies in a non-audible range, namely, 18 kHz to 20 kHz, and 40 kHz, to the vicinity of the image forming apparatus 10. When having output a pulse wave of 40 kHz in the non-audible range, the ultrasonic sensor receives a reflected wave of the pulse wave that was reflected off an object. Based on a time period from the output of the pulse wave to the reception of the reflected wave, the ultrasonic sensor can also measure a distance between the image forming apparatus 10 and the object. Also, when having output a pulse wave of 18 kHz to 20 kHz in the non-audible range, the ultrasonic sensor can perform ultrasonic communication with an external terminal such as a smartphone.

The human detection sensor unit 600 of the image forming apparatus 10 has two or more levels of detection areas, such as detection areas A1 and A2. In the present embodiment, it is assumed that the detection area A1 is an area in which a human is detected, and the detection area A2 is an area in which ultrasonic communication is performed. Furthermore, the human detection sensor unit 600 is arranged taking into consideration height and orientation, so as to facilitate human detection. A scanner unit 300 and an operation unit 500 will be described in detail later with reference to FIG. 2.

Control Configuration

The following will describe a control configuration of the image forming apparatus 10 according to the present embodiment with reference to FIG. 2. The image forming apparatus 10 includes a main controller unit 200, the scanner unit 300, a printer unit 400, the operation unit 500, and the human detection sensor unit 600.

The main controller unit 200 is connected to the scanner unit 300, the printer unit 400, and the operation unit 500. The main controller unit 200 includes a CPU 221, a RAM 214, a ROM 226, a power supply control unit 211, an HDD 225, an image processing unit 222, a LAN controller 212, and a FAX controller 213. Furthermore, the main controller unit 200 includes a scanner I/F 223 and a printer I/F 224, which serve as interfaces.

When power is supplied with from the power supply control unit 211, the CPU 221 performs booting by reading boot data from the ROM 226, and loading data such as an application from the HDD 225 to the RAM 214. The LAN controller 212 is connected to the CPU 221 via a system bus 228, and receives print data from a device such as a PC via a LAN I/F 231. The received print data is temporarily stored in the HDD 225 by the CPU 221 via the RAM 214, and is subjected to image processing by the image processing unit 222, and the processed print data is then used for print processing by the printer unit 400 via the printer I/F 224. Furthermore, wireless Wi-Fi communication may be performed without using the LAN I/F 231.

The FAX controller 213 is connected to the CPU 221 via the system bus 228, and receives facsimile data from a facsimile machine via a facsimile I/F 232. The received facsimile data is temporarily stored in the HDD 225 by the CPU 221 via the RAM 214, and is subjected to image processing by the image processing unit 222, and the processed facsimile data is then used for print processing by the printer unit 400 via the printer I/F 224.

The scanner unit 300 reads a document, creates electronic data regarding the read document, and transmits the data to the system bus 228 via the scanner I/F 223. The operation unit 500 displays data transmitted from the CPU 221, and notifies, upon an input made by a user to the operation unit 500, the CPU 221 of the content of the input. When the image forming apparatus 10 in a power saving mode (ST1) has detected a human, the human detection sensor unit 600 will notify the operation unit 500 with an interrupt signal. Then, the image forming apparatus 10 shifts from the power saving mode (ST1) to a normal operation power mode (ST2). Details thereof will be described later.

Detailed Blocks

The following will describe details of a control configuration of the image forming apparatus 10 with reference to FIG. 3. The scanner unit 300 is provided with a scanner control unit 321 and a scanner driving unit 322, and optically reads an image from a document to generate image data. The scanner driving unit 322 includes a driving unit for moving a reading head for reading a document, a driving unit for conveying a document to the reading position, and the like. The scanner control unit 321 controls the operations of the scanner driving unit 322. The scanner control unit 321 communicates with the main controller unit 200 to receive setting information set by a user when he or she performs scan processing, and controls the operations of the scanner driving unit 322 based on the setting information.

The printer unit 400 is provided with a printer control unit 421 and a printer driving unit 422, and forms an image on a recording medium (sheet or paper) in compliance with electrophotography. The printer driving unit 422 includes a motor for rotating a photoconductive drum, a fixer pressing mechanism, a heater, and the like, which are not shown. The printer control unit 421 controls the operations of the printer driving unit 422. The printer control unit 421 communicates with the main controller unit 200 to receive setting information set by a user when he or she performs print processing, and controls the operations of the printer driving unit 422 based on the setting information to execute image formation.

The main controller unit 200 performs overall control of the operations of the image forming apparatus 10 including the scanner unit 300 and the printer unit 400 in accordance with an instruction made by a user that was input to the operation unit 500. Furthermore, the main controller unit 200 processes image data input from the scanner unit 300, a facsimile machine, or a PC to output the processed image data to the printer unit 400, or performs control of operations of a power supply unit 100 so as to control the power mode of the image forming apparatus 10.

The interior of the main controller unit 200 is divided by at least two power supply lines, namely, a power supply line 1, which is a circuit part that needs to also operate during the power saving mode, and a power supply line 2, which is a circuit part that does not need to operate during the power saving mode. Power is always supplied to the power supply line 1 by an internal power generation unit 202 that is supplied with power via the power supply I/F 201. The power supply control unit 211, the FAX controller 213, and the LAN controller 212 are connected to the power supply line 1 so as to be able to respond upon a facsimile or a print request being received from a network even when the apparatus is in the power saving mode.

The ROM 226, which is needed at the time of booting, and the image processing unit 222, the scanner I/F 223, the printer I/F 224, and the HDD 225, which are needed at the time of the copy operation, are connected to the power supply line 2, and no current is applied to these components in the power saving mode. When, during the power saving mode, any one of interrupt signals A to D from the respective connected components is input to the power supply control unit 211, the power supply control unit 211 controls the internal power generation unit 202 to apply a current to the power supply line 2 and cancel the power saving mode.

The interrupt signal A is a signal that is output by the LAN controller 212 when it has received a print job packet or a state check packet from the LAN. The interrupt signal B is a signal that is output by the FAX controller 213 when it has received a facsimile from a facsimile line. The interrupt signals C and D are signals that are output from a microcomputer 514 of the operation unit 500, and will be described in detail later.

When a current is also applied to the power supply line 2 of the main controller unit 200 in response to any of the interrupt signals A to D, the CPU 221 reads the state from the RAM 214 that continuously performs a self-refreshing operation in the power supply line 1, in order to return the apparatus to the state before the shift to the power saving mode. Thereafter, when the image forming apparatus 10 returns to normal operation, the CPU 221 performs processing that corresponds to the return factor of the corresponding interrupt signals A to D.

The LAN controller 212 can also perform not only communication using the LAN I/F 231 but also wireless LAN communication using a wireless communication unit 215. The operation unit 500 includes an LCD touch panel 524 into which an LCD panel and a touch panel are incorporated, a key unit 516 such as a numeric keypad and a start key for detecting a key operation of a user, and a buzzer 526. Furthermore, the operation unit 500 includes a touch panel controller 515, a power saving button 512, a power saving LED 513, a main power-supply LED 511, the buzzer 526, a notification LED unit 527, and a microcomputer 514 for controlling the human detection sensor unit 600.

The LCD touch panel 524 renders image data that was generated by the CPU 221 of the main controller unit 200 and was received by a LCD controller 523. When a user has touched and operated the screen of the LCD touch panel 524, the touch panel controller 515 analyzes coordinate data regarding the touched position and notifies the microcomputer 514 of the coordinate data, and the microcomputer 514 notifies the CPU 221 of the coordinate data. Furthermore, the microcomputer 514 scans the operation of the key unit 516 on a regular basis, and notifies, when a user operation is detected on the key unit 516, the CPU 221 of the detected operation. The CPU 221 that was has been notified of the user operation on the LCD touch panel 524 or the key unit 516, operates the image forming apparatus 10 according to the operation content.

The operation unit 500 includes multiple types of LEDs. The main power-supply LED 511 is always turned on when main power of the image forming apparatus 10 is supplied. The notification LED unit 527 is controlled by the microcomputer 514, and notifies a user of the state of the image forming apparatus 10 such as a state in which a job is being executed or a state in which an error has occurred.

The interior of the operation unit 500 is divided by at least two power supply lines, namely, the power supply line 1, which is a circuit part that needs to also operate during the power saving mode, and the power supply line 2, which is a circuit part that does not need to operate during the power saving mode. The microcomputer 514, the main power-supply LED 511, the power saving button 512, the touch panel controller 515, and the key unit 516 are connected to the power supply line 1. The LCD controller 523, the LCD touch panel 524, the buzzer 526, and the notification LED unit 527 are connected to the power supply line 2, and power supply to them is cut off during the power saving mode.

The human detection sensor unit 600 is connected to the power supply line 1, and is capable of detecting a movement of a human even during the power saving mode. The detection of a movement of a human is executed by the microcomputer 514 reading the state of an ultrasonic sensor 611 on a regular basis, and performing processing thereon. An ultrasonic communication LED 612 is controlled by the microcomputer 514, and is turned on or blinks while the image forming apparatus 10 performs ultrasonic communication. A volume adjustment unit 613 changes the volume of an ultrasonic wave to be output from the ultrasonic sensor 611, by changing the gain of a signal to be transmitted to the ultrasonic sensor 611.

A terminal (external terminal) 700 is a mobile terminal, and is capable of receiving data for ultrasonic communication via a microphone of the terminal. Furthermore, the terminal 700 has a wireless LAN function, and performs wireless communication with the wireless communication unit 215 of the image forming apparatus 10.

State Transition

The following will describe the state transition of the image forming apparatus 10 with reference to FIG. 4. The image forming apparatus 10 has, as operation states, the normal operation power mode (ST2), in which a copy operation or the like is executed and a current can be applied to all the loads of the image forming apparatus 10, and the power saving mode (ST1), in which power consumption is less than that in the normal operation power mode (ST2). That is, in the power saving mode (ST1), a current is applied only to some of the loads of the image forming apparatus 10. Furthermore, the image forming apparatus 10 has an ultrasonic communication operation mode (ST3), in which a current is applied to not only the loads to which a current is applied in the power saving mode (ST1) but also a load that performs ultrasonic communication with a portable device of a user. The following will describe the state transition between the three states.

Control of the power modes is performed by the main controller unit 200 controlling the power supply unit 100. In the power saving mode (ST1), the power supply control unit 211 stops the power supply to the scanner unit 300, the printer unit 400, and the like, and allows the power supply to the interior of the main controller unit 200, the interior of the operation unit 500, and the human detection sensor unit 600.

In the power saving mode (ST1), the microcomputer 514 performs polling of an output of the ultrasonic sensor 611, and if a human has been detected in the detection area A1, the image forming apparatus 10 shifts to the normal operation power mode (ST2). Furthermore, in the normal operation power mode (ST2), the microcomputer 514 performs polling of an output of the ultrasonic sensor 611, and if the human has been detected in the detection area A2, the image forming apparatus 10 shifts to the ultrasonic communication operation mode (ST3). Furthermore, in the normal operation power mode (ST2), if the image forming apparatus 10 has not been used for a predetermined time period and no human has been detected in the detection area A1 by the microcomputer 514, the image forming apparatus 10 shifts to the power saving mode (ST1).

Furthermore, in the ultrasonic communication operation mode (ST3), the image forming apparatus 10 changes the frequency used by the ultrasonic sensor 611 to 18 kHz to 20 kHz in order for the microcomputer 514 to perform ultrasonic communication, and transmits data for the ultrasonic communication. Furthermore, in the ultrasonic communication operation mode (ST3), when data transmission to the terminal 700 is complete, the microcomputer 514 will end the ultrasonic communication, and the image forming apparatus 10 will shift to the normal operation power mode (ST2).

Frequency

The following will describe switching control of ultrasonic frequencies with respect to the ultrasonic sensor 611 that is performed by the microcomputer 514 according to the present embodiment, with reference to FIG. 5. The microcomputer 514 performs switching of the frequency between a human detecting time period T1 and an ultrasonic communication time period T2.

The human detecting time period T1 is a time period for detecting a human. Accordingly, the microcomputer 514 outputs an ultrasonic wave of 40 kHz from the ultrasonic sensor 611, then receives a reflected wave from a human, and measures a distance to the human based on a time period from the transmission of the ultrasonic wave of 40 kHz to the reception of the reflected wave. On the other hand, the ultrasonic communication time period T2 is a time period in which data is transmitted based on a difference in the ultrasonic frequencies up to 20 kHz. The details of communication will be described later with reference to FIG. 6. The microcomputer 514 can switch between the human detecting time period T1 and the ultrasonic communication time period T2 so as to realize both functions.

FIG. 6 shows a frequency shift keying (FSK) modulation method as an example of a data transmission method when the microcomputer 514 performs ultrasonic communication. 18 kHz and 19 kHz are used as ultrasonic frequencies for communication, and during a time period defined by 1 bit, 18 kHz is output when a data value "0" is to be transmitted, and 19 kHz is output when a data value "1" is to be transmitted. The terminal 700 can recognize the difference between the frequencies and can receive the frequencies as significant data. The example in FIG. 6 shows the transmitted wave when the data "01110" is transmitted with ultrasonic communication.

Processing Procedure

The following will describe a processing procedure of the image forming apparatus 10 according to the present embodiment with reference to FIGS. 7 to 10. The processing that is to be described below is essentially realized by the CPU 221 of the image forming apparatus 10 reading a control program stored in advance in the ROM 226 or the HDD 225 to the RAM 214 and executing it, or is realized by the microcomputer 514. Note that power supply control is performed by the power supply control unit 211.

In step S101, the image forming apparatus 10 is in the power saving mode (ST1), and the microcomputer 514 detects the state of the human detection sensor unit 600 on regular basis. When operating in a human detection mode, the human detection sensor unit 600 outputs an ultrasonic wave of 40 kHz and receives a reflected wave thereof. FIG. 8 shows the current applied state of the power supply when the image forming apparatus 10 is in the power saving mode (ST1). In FIG. 8, hatched components are denoted as being in the state in which no current is applied, and the other components are denoted as being in the state in which a current is applied.

In step S102, the image forming apparatus 10 is in the power saving mode (ST1), and determines whether or not the microcomputer 514 has detected a human in the detection area A1 of the human detection sensor unit 600, based on the detection in step S101. If the microcomputer 514 has detected a human in the detection area A1 of the human detection sensor unit 600, the image forming apparatus 10 shifts, in step S103, from the power saving mode (ST1) to the normal operation power mode (ST2). Furthermore, in step S103, the image forming apparatus 10 is in the normal operation power mode (ST2), and the microcomputer 514 detects the state of the human detection sensor unit 600 on a regular basis. FIG. 9 shows the current applied state of the power supply when the image forming apparatus 10 is in the normal operation power mode (ST2). In FIG. 9, hatched components are denoted as being in the state in which no current is applied, and the other components are denoted as being in the state in which a current is applied. As shown in FIG. 9, in the normal operation power mode (ST2), a current is applied to blocks other than those that are currently not in use, for example, the printer driving unit 422, the scanner driving unit 322, and the ultrasonic communication LED 612. A current will also be applied to these three blocks as needed.

In step S104, the image forming apparatus 10 is in the normal operation power mode (ST2), and determines whether or not the microcomputer 514 has detected the human in the detection area A2 of the human detection sensor unit 600. As described above, the detection area A2 is a range that is closer to the image forming apparatus 10 than the detection area A1, and it is possible to determine whether or not the human detected in the detection area A1 in step S102 has approached the image forming apparatus 10. If the microcomputer 514 has detected the human in the detection area A2 of the human detection sensor unit 600, the image forming apparatus 10 will shift from the normal operation power mode (ST2) to the ultrasonic communication operation mode (ST3). In the other words, the state transition is made in order to perform ultrasonic communication with a mobile terminal in possession of the human detected in the detection area A2.

In step S105, the image forming apparatus 10 is in the ultrasonic communication operation mode (ST3), and the microcomputer 514 starts the ultrasonic communication. Specifically, the microcomputer 514 transmits, to the ultrasonic sensor 611, data desired to be transmitted with the ultrasonic communication. Furthermore, the ultrasonic wave output by the ultrasonic sensor 611 is received by, for example, the terminal 700 held by the detected human. FIG. 10 shows the current applied state of the power supply when the image forming apparatus 10 is in the ultrasonic communication operation mode (ST3). In FIG. 10, hatched components are denoted as being in the state in which no current is applied, and the other components are denoted as being in the state in which a current is applied. As shown in FIG. 10, in the ultrasonic communication operation mode (ST3), the state is achieved in which a current is applied to a larger number of components including the ultrasonic communication LED 612, than those in the normal operation power mode (ST2). When operating in an ultrasonic communication mode, an ultrasonic wave of 18 kHz to 20 kHz is output, and communication is performed with a terminal such as a smartphone in possession of the user.

In step S106, the microcomputer 514 checks whether or not the transmission of the data desired to be transmitted with the ultrasonic communication is complete. If the transmission of the data is complete, the image forming apparatus 10 shifts to the normal operation power mode (ST2). If the transmission of the data is not complete, the determination in step S106 is repeated on a regular basis. In step S107, the ultrasonic sensor 611 operates in the human detection mode since the image forming apparatus 10 has shifted to the normal operation power mode. In other words, the control of the ultrasonic sensor 611 is switched from the ultrasonic communication mode to the human detection mode for detecting a human in the detection area A2.

As described above, the present image forming apparatus 10, which is an information processing apparatus, uses an ultrasonic wave that was output at a first frequency (40 kHz) from the ultrasonic sensor 611 to detect a human who is present in a first range (detection area A1) from the image forming apparatus 10. Furthermore, when having detected a human in the detection area A1, the image forming apparatus 10 switches the frequency of an ultrasonic wave that is output from the ultrasonic sensor 611 to a second frequency (18 kHz to 20 kHz) that is lower than the first frequency (40 kHz). Accordingly, the human is detected in a second range (detection area A2) that is smaller than the detection area A1. When having detected a human in the detection area A2, the image forming apparatus 10 starts data communication using the ultrasonic wave that is output from the ultrasonic sensor 611. Accordingly, the image forming apparatus 10 according to the present embodiment uses one ultrasonic sensor 611 both as a human detection sensor and for data communication, and when a human has approached the image forming apparatus 10, the image forming apparatus 10 switches the frequency of the ultrasonic wave that is output from the ultrasonic sensor 611 to a lower frequency so as to perform data communication. Accordingly, it is possible to reduce output of a frequency for communication that creates an audible sound unpleasant to a human approaching the image forming apparatus 10.

Second Embodiment

Hereinafter, a second embodiment of the present invention will be described with reference to FIG. 11. FIG. 11 shows a processing procedure of the image forming apparatus 10 according to the present embodiment. The processing that is to be described below is essentially realized by the CPU 221 of the image forming apparatus 10 reading a control program stored in advance in the ROM 226 or the HDD 225 to the RAM 214 and executing it, or is realized by the microcomputer 514. Note that power supply control is performed by the power supply control unit 211. Furthermore, processes in steps S201 to S204 of FIG. 11 are the same as those of steps S101 to S104 of FIG. 7 and thus descriptions thereof are omitted.

In step S205, the microcomputer 514 causes the ultrasonic sensor 611 to operate in the human detection mode and to measure a distance to the human. Subsequently, in step S206, the microcomputer 514 causes the volume adjustment unit 613 to adjust the volume of an ultrasonic wave for use in ultrasonic communication, based on the distance measured in step S205. Specifically, the frequency of the ultrasonic communication that is to start in step S207 is adjusted. For example, the microcomputer 514 typically performs the control, based on the measured distance to the human, such that the volume is increased (to 20 kHz, for example) when the human is present at a location distanced from the image forming apparatus 10, and the volume is decreased (to 18 kHz, for example) when the human is present closer to the image forming apparatus 10. By performing control in such a manner, it is possible to reduce output of an audible sound that is unpleasant to the user (detected human) of the image forming apparatus 10. Thereafter, in step S207, the microcomputer 514 uses the controlled frequency to start ultrasonic communication (18 kHz to 20 kHz).

In step S208, the microcomputer 514 checks whether or not the data transmission with ultrasonic communication is complete, and if the data transmission is not complete, the procedure returns to step S205. If the data transmission is complete, the image forming apparatus 10 shifts to the normal operation power mode (ST2). Then, after the shift to the normal operation power mode, in step S209, the image forming apparatus 10 causes the ultrasonic sensor 611 to operate in the human detection mode.

As described above, the image forming apparatus 10 according to the present embodiment measures, upon having detected a human in the detection area A1, a distance between the human and the image forming apparatus 10, and switches the frequency based on the measured distance to adjust the range of the detection area A2 and the volume of the ultrasonic wave. Accordingly, the control of the first embodiment can be performed more accurately, and thereby a greater effect can be achieved.

Third Embodiment

Hereinafter, a third embodiment of the present invention will be described with reference to FIGS. 12 and 13. FIG. 12 shows a screen of the operation unit 500 for adjusting sensitivity for human detection performed by the image forming apparatus 10. A user can adjust sensitivity for human detection using this screen 1200. The screen 1200 includes buttons 1201 and 1202 for setting the sensitivity, a cancel button 1203, and an OK button 1204, and can set the sensitivity for human detection. By selecting whether to decrease or increase the sensitivity using the buttons 1201 and 1202 and operating the OK button, the user can confirm the setting. Note that the cancel button 1203 is operated in order to cancel the selected setting. The microcomputer 514 adjusts the range of the detection area A2, which is an area in which a human is to be detected, based on the value set in this screen.

FIG. 13 shows a processing procedure of the image forming apparatus 10 according to the present embodiment. The processing that is described below is essentially realized by the CPU 221 of the image forming apparatus 10 reading a control program stored in advance in the ROM 226 or the HDD 225 to the RAM 214 and executing it, or is realized by the microcomputer 514. Note that power supply control is performed by the power supply control unit 211. Furthermore, steps S301 to S303 of FIG. 13 are the same as steps S101 to S103 of FIG. 7, and thus descriptions thereof are omitted.

In step S304, the microcomputer 514 determines whether or not the sensitivity for human detection has been adjusted via the screen 1200. If the sensitivity for human detection has been changed, the procedure advances to step S305, where the microcomputer 514 changes the range of the detection area A2 at which ultrasonic communication starts, based on the changed and set sensitivity. If the sensitivity for human detection has not been changed in step S304, and if the range of the area for ultrasonic communication has been changed in step S305, the procedure advances to step S306.

In step S306, the image forming apparatus 10 is in the normal operation power mode (ST2), and the microcomputer 514 determines whether or not a human has been detected in the detection area A2 of the human detection sensor unit 600. If the microcomputer 514 determines that a human has been detected in the detection area A2 of the human detection sensor unit 600, the image forming apparatus 10 shifts from the normal operation power mode (ST2) to the ultrasonic communication operation mode (ST3), and the procedure advances to step S307.

In step S307, the image forming apparatus 10 is in the ultrasonic communication operation mode (ST3), and the microcomputer 514 transmits, to the ultrasonic sensor 611, data desired to be transmitted with ultrasonic communication. The ultrasonic sensor 611 transmits an ultrasonic wave based on the data.

In step S308, the microcomputer 514 determines whether or not the ultrasonic sensor 611 has completed the transmission of the data desired to be transmitted with ultrasonic communication. If the transmission of the data is complete, the image forming apparatus 10 shifts to the normal operation power mode (ST2), and the procedure advances to step S309. Otherwise, the procedure returns to step S307. In step S309, the ultrasonic sensor 611 operates in the human detection mode since the image forming apparatus 10 has shifted to the normal operation power mode.

As described above, the image forming apparatus 10 according to the present embodiment determines the detection range of the detection area A2, that is, the frequency of the ultrasonic sensor 611, based on the sensitivity for human detection that was adjusted via the screen 1200. Accordingly, the control of the first embodiment can further be adjusted to the control desired by a user.

Fourth Embodiment

Hereinafter, a fourth embodiment of the present invention will be described with reference to FIG. 14. FIG. 14 shows a processing procedure of the image forming apparatus 10 according to the present embodiment. The processing that is described below is essentially realized by the CPU 221 of the image forming apparatus 10 reading a control program stored in advance in the ROM 226 or the HDD 225 to the RAM 214 and executing it, or is realized by the microcomputer 514. Note that power supply control is performed by the power supply control unit 211. Furthermore, steps S401 to S404 of FIG. 13 are the same as steps S101 to S104 of FIG. 7, and thus descriptions thereof are omitted.

In step S405, the microcomputer 514 determines whether or not the sensitivity for human detection has been adjusted via the screen 1200. If the sensitivity has been changed, the procedure advances to step S406, where the microcomputer 514 adjusts the volume for ultrasonic communication. If the sensitivity has not been changed in step S405, and if the adjustment of the volume for ultrasonic communication in step S406 is complete, the procedure advances to step S407.

In step S407, the image forming apparatus 10 is in the ultrasonic communication operation mode (ST3), and the microcomputer 514 transmits, to the ultrasonic sensor 611, data desired to be transmitted with ultrasonic communication. The ultrasonic sensor 611 transmits an ultrasonic wave based on the data.

In step S408, the microcomputer 514 determines whether or not the ultrasonic sensor 611 has completed the transmission of the data desired to be transmitted with ultrasonic communication. If the transmission of the data is complete, the image forming apparatus 10 shifts to the normal operation power mode (ST2), and the procedure advances to step S409. Otherwise, the procedure returns to step S407. In step S409, the ultrasonic sensor 611 operates in the human detection mode since the image forming apparatus 10 has shifted to the normal operation power mode.

As described above, the image forming apparatus 10 according to the present embodiment adjusts the volume of the ultrasonic wave that is output from the ultrasonic sensor 611, that is, the frequency of the ultrasonic sensor 611, based on the sensitivity for human detection that was adjusted via the screen 1200. Accordingly, the control of the first embodiment can further be adjusted to the control desired by a user.

Fifth Embodiment

Hereinafter, a fifth embodiment of the present invention will be described with reference to FIGS. 15 and 16. FIG. 15 shows an ultrasonic setting screen 1500 of the operation unit 500. The mode settings of the image forming apparatus 10 can be configured on the ultrasonic setting screen 1500 by a user selecting an enable button 1502 or a disable button 1501 for the human detection mode and selecting an enable button 1504 or a disable button 1503 for the ultrasonic communication mode. When the disable button 1501 is selected for the human detection mode on the ultrasonic setting screen 1500, in order for the image forming apparatus 10 to return from the power saving mode (ST1) to the normal operation power mode (ST2), a user can operate the power saving button 512 to perform a shift. Furthermore, when the disable button 1503 is selected for the ultrasonic communication mode, the user needs to configure Wi-Fi settings at his or her terminal such as a smartphone.

FIG. 16 shows a processing procedure of the image forming apparatus 10 according to the present embodiment. The processing that is described below is essentially realized by the CPU 221 of the image forming apparatus 10 reading a control program stored in advance in the ROM 226 or the HDD 225 to the RAM 214 and executing it, or is realized by the microcomputer 514. Note that power supply control is performed by the power supply control unit 211.

In step S501, the image forming apparatus 10 is in the power saving mode (ST1), and the microcomputer 514 detects the state of the human detection sensor unit 600 on a regular basis. When operating in the human detection mode, the human detection sensor unit 600 outputs an ultrasonic wave of 40 kHz, and receives a reflected wave thereof. Then, in step S502, the image forming apparatus 10 is in the power saving mode (ST1), and the microcomputer 514 determines, based on the detection in step S501, whether or not a human has been detected in the detection area A1 of the human detection sensor unit 600. If the microcomputer 514 determines that a human has been detected in the detection area A1 of the human detection sensor unit 600, the procedure advances to step S503. Here, when the disable button 1501 has been set for the human detection mode on the ultrasonic setting screen 1500, the image forming apparatus 10 does not shift from the power saving mode (ST1) to the normal operation power mode (ST2), and remains in the power saving mode.

Then, in step S503, the image forming apparatus 10 is in the power saving mode (ST1), and the microcomputer 514 determines whether or not a human has been detected in the detection area A2 of the human detection sensor unit 600. If the microcomputer 514 determines that the human has been detected in the detection area A2 of the human detection sensor unit 600, the image forming apparatus 10 shifts from the power saving mode (ST1) to the ultrasonic communication operation mode (ST3), and the procedure advances to step S504.

In step S504, the image forming apparatus 10 is in the ultrasonic communication operation mode (ST3), and the microcomputer 514 transmits, to the ultrasonic sensor 611, data desired to be transmitted with ultrasonic communication. The ultrasonic sensor 611 transmits an ultrasonic wave based on the data. Note here that the disable button 1503 has been set for the ultrasonic communication mode on the ultrasonic setting screen 1500, and the image forming apparatus 10 will wait until it receives Wi-Fi settings and the like that are made by the user and transmitted from the terminal 700.

In step S505, the microcomputer 514 determines whether or not the ultrasonic sensor 611 has completed the transmission of the data desired to be transmitted with ultrasonic communication. If the transmission of the data is complete, the image forming apparatus 10 shifts to the normal operation power mode (ST2), and the procedure advances to step S506. Otherwise, the processing returns to step S504. In step S506, the ultrasonic sensor operates in the human detection mode since the image forming apparatus 10 has shifted to the normal operation power mode.

As described above, the image forming apparatus 10 according to the present embodiment has a configuration that enables human detection and ultrasonic communication to be set to be enabled or disabled. Specifically, when the human detection is set to be disabled, the image forming apparatus 10 does not perform a state transition from the power saving mode (ST1) to the normal operation power mode (ST2) even when a human has been detected in the detection area A1 in contrast to the first embodiment, and remains in the power saving mode (ST1) and changes to detection in the detection area A2. Accordingly, it is possible to set the respective functions to be enabled/disabled, and to perform an operation that corresponds to the installation environments of the image forming apparatus 10, or an operation desired by a user.

Other Embodiments

Embodiment(s) of the present invention can also be realized by a computer of a system or apparatus that reads out and executes computer executable instructions (e.g., one or more programs) recorded on a storage medium (which may also be referred to More fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-180117 filed on Sep. 11, 2015, which is hereby incorporated by reference herein in its entirety.

The invention claimed is:

1. An information processing apparatus comprising:
an ultrasonic sensor that outputs an ultrasonic wave to a vicinity of the information processing apparatus;
a human detection unit that detects a human located in the vicinity of the information processing apparatus using the ultrasonic wave output from the ultrasonic sensor;
a communication interface that performs data communication between the information processing apparatus and an external terminal, using the ultrasonic wave output from the ultrasonic sensor;
a memory device that stores a set of instructions; and
at least one processor that executes the instructions to:
switch, if the human detection unit has detected a human present in a first range from the information processing apparatus using the ultrasonic wave that was output at a first frequency from the ultrasonic sensor, the frequency of the ultrasonic wave that is output from the ultrasonic sensor unit to a second frequency that is lower than the first frequency, control the human detection unit to detect the human in a second range that is smaller than the first range, and start the data communication using the communication interface if the human is detected in the second range by the human detection unit.

2. The information processing apparatus according to claim 1,
wherein the at least one processor executes instructions in the memory device to transmit data by modulating the second frequency in the ultrasonic wave that is output from the ultrasonic sensor.

3. The information processing apparatus according to claim 2,
wherein the at least one processor executes instructions in the memory device to, when the data transmission using the communication interface is complete, switch the frequency of the ultrasonic wave that is output from the ultrasonic sensor to the first frequency.

4. The information processing apparatus according to claim 1, wherein the at least one processor executes instructions in the memory device to:
measure a distance between a human detected by the human detection unit and the information processing apparatus, using the ultrasonic wave that was output at the first frequency from the ultrasonic; and
adjust a volume of the ultrasonic wave that is output from the ultrasonic sensor by adjusting the second frequency to be used for the ultrasonic wave, based on the measured distance.

5. The information processing apparatus according to claim 4,
wherein the at least one processor executes instructions in the memory device to adjust the second frequency to be lower the more the distance decreases.

6. The information processing apparatus according to claim 1, wherein the at least one processor executes instructions in the memory device to:
set a sensitivity for human detection performed by the human detection unit; and
determine the second frequency based on the set sensitivity for human detection.

7. The information processing apparatus according to claim 1, wherein the at least one processor executes instructions in the memory device to:
set a sensitivity for human detection performed by the human detection unit; and
adjust a volume of the ultrasonic wave that is output from the ultrasonic sensor by adjusting the second frequency to be used for the ultrasonic wave, based on the set sensitivity for human detection.

8. The information processing apparatus according to claim 1, wherein the at least one processor executes instructions in the memory device to:
control power supply to the information processing apparatus between a normal operation power mode, in which a current is applicable to all loads of the information processing apparatus, a power saving mode, in which a current is applied to some of the loads of the information processing apparatus, and an ultrasonic communication operation mode, in which a current is applied not only to the loads to which a current is applied in the power saving mode but also to the communication interface.

9. The information processing apparatus according to claim 8, wherein the at least one processor executes instructions in the memory device to:
control the information processing apparatus to be in the power saving mode while the ultrasonic wave is output at the first frequency from the ultrasonic sensor,
shift the information processing apparatus to the normal operation power mode when a human is detected in the first range by the human detection unit, and
shift the information processing apparatus to the ultrasonic communication operation mode when the human is detected in the second range by the human detection unit.

10. The information processing apparatus according to claim 8, wherein the at least one processor executes instructions in the memory device to:
set mode shift of the information processing apparatus that is performed when a human is detected by the human detection unit, to be enabled or disabled,
control the information processing apparatus to be in the power saving mode while the ultrasonic wave is output at the first frequency from the ultrasonic sensor, and
shift the information processing apparatus to the ultrasonic communication operation mode when a human is detected in the second range by the human detection unit.

11. The information processing apparatus according to claim 10,
wherein the at least one processor executes instructions in the memory device to set the data communication that is performed by the communication interface to be enabled or disabled, and
the communication interface performs the data communication with the external terminal, when the information processing apparatus is shifted to the ultrasonic communication operation mode and is connected to the external terminal.

12. A control method of an information processing apparatus that includes: an ultrasonic sensor that outputs an ultrasonic wave to a vicinity of the information processing apparatus; a human detection unit that detects a human located in the vicinity of the information processing apparatus using the ultrasonic wave output from the ultrasonic sensor; a communication interface that performs data communication between the information processing apparatus and an external terminal, using the ultrasonic wave output from the ultrasonic sensor, the control method comprising:
   switching, if the human detection unit has detected a human present in a first range from the information processing apparatus using the ultrasonic wave that was output at a first frequency from the ultrasonic sensor, the frequency of the ultrasonic wave that is output from the ultrasonic sensor to a second frequency that is lower than the first frequency;
   controlling the human detection unit to detect the human in a second range that is smaller than the first range; and
   starting the data communication using the communication interface if the human is detected in the second range by the human detection unit.

13. A non-transitory computer-readable storage medium storing a program for causing a computer to execute the steps of the control method of an information processing apparatus that includes: an ultrasonic sensor that outputs an ultrasonic wave to a vicinity of the information processing apparatus; a human detection unit that detects a human located in the vicinity of the information processing apparatus using the ultrasonic wave output from the ultrasonic sensor; a communication interface that performs data communication between the information processing apparatus and an external terminal, using the ultrasonic wave output from the ultrasonic sensor, the control method comprising:
   switching, if the human detection unit has detected a human present in a first range from the information processing apparatus using the ultrasonic wave that was output at a first frequency from the ultrasonic sensor, the frequency of the ultrasonic wave that is output from the ultrasonic sensor to a second frequency that is lower than the first frequency;
   controlling the human detection unit to detect the human in a second range that is smaller than the first range; and
   starting the data communication using the communication interface if the human is detected in the second range by the human detection unit.

* * * * *